United States Patent [19]

Leenhouts

[11] 4,066,944
[45] Jan. 3, 1978

[54] MOTION CONTROL SYSTEM WITH INCREMENTAL DATA COMMANDS

[75] Inventor: Albert C. Leenhouts, Harwinton, Conn.

[73] Assignee: The Superior Electric Company, Bristol, Conn.

[21] Appl. No.: 683,883

[22] Filed: May 6, 1976

[51] Int. Cl.² .......................................... G05B 19/28
[52] U.S. Cl. .................................... 318/571; 318/603
[58] Field of Search ................. 318/600, 603, 571; 235/151.11

[56] References Cited

U.S. PATENT DOCUMENTS

| | | | |
|---|---|---|---|
| 3,466,515 | 9/1969 | Madsen et al. | 318/603 |
| 3,766,459 | 10/1973 | McIntosh et al. | 318/603 |
| 3,963,971 | 6/1976 | Leenhouts et al. | 318/603 |
| 3,995,207 | 11/1976 | Way | 318/603 |
| 4,000,451 | 12/1976 | Leenhouts | 318/600 |

Primary Examiner—B. Dobeck
Attorney, Agent, or Firm—Ernest M. Junkins

[57] ABSTRACT

A system for accepting commands of the number of steps in a movement and for producing motion commands in a motion system that divides the movement into the number of steps in successive time intervals with the motion commands consisting of altering the number of steps between adjacent time intervals that are required to produce the movement.

11 Claims, 3 Drawing Figures

FIG. 2

| STEPS | INCREMENTAL DATA | | | | STEPS PER INTERVAL | | | | | | | | COMMAND PER INTERVAL | | | | | | | |
|---|---|---|---|---|---|---|---|---|---|---|---|---|---|---|---|---|---|---|---|---|
| | Z | Y | X | W | 0 | 1 | 2 | 3 | 4 | 5 | 6 | 7 | 0 | 1 | 2 | 3 | 4 | 5 | 6 | 7 |
| 0 | 0 | 0 | 0 | 0 | 0 | | | | | | | | - | - | - | - | - | - | - | - |
| 1 | 0 | 0 | 0 | 1 | 1 | 0 | | | | | | | P | Q | - | - | - | - | - | - |
| 2 | 0 | 0 | 1 | 0 | 1 | 1 | 0 | | | | | | P | - | Q | - | - | - | - | - |
| 3 | 0 | 0 | 1 | 1 | 1 | 1 | 1 | 0 | | | | | P | - | - | Q | - | - | - | - |
| 4 | 0 | 1 | 0 | 0 | 1 | 2 | 1 | 0 | | | | | P | P | Q | Q | - | - | - | - |
| 5 | 0 | 1 | 0 | 1 | 1 | 2 | 1 | 1 | 0 | | | | P | P | Q | - | Q | - | - | - |
| 6 | 0 | 1 | 1 | 0 | 1 | 2 | 2 | 1 | 0 | | | | P | P | - | Q | Q | - | - | - |
| 7 | 0 | 1 | 1 | 1 | 1 | 2 | 2 | 1 | 1 | 0 | | | P | P | - | Q | - | Q | - | - |
| 8 | 1 | 0 | 0 | 0 | 1 | 2 | 2 | 2 | 1 | 0 | | | P | P | - | - | Q | Q | - | - |
| 9 | 1 | 0 | 0 | 1 | 1 | 2 | 3 | 2 | 1 | 0 | | | P | P | P | Q | Q | Q | - | - |
| 10 | 1 | 0 | 1 | 0 | 1 | 2 | 3 | 2 | 1 | 1 | 0 | | P | P | P | Q | Q | - | Q | - |
| 11 | 1 | 0 | 1 | 1 | 1 | 2 | 3 | 2 | 2 | 1 | 0 | | P | P | P | Q | - | Q | Q | - |
| 12 | 1 | 1 | 0 | 0 | 1 | 2 | 3 | 3 | 2 | 1 | 0 | | P | P | P | - | Q | Q | Q | - |
| 13 | 1 | 1 | 0 | 1 | 1 | 2 | 3 | 3 | 2 | 1 | 1 | 0 | P | P | P | - | Q | Q | - | Q |
| 14 | 1 | 1 | 1 | 0 | 1 | 2 | 3 | 3 | 2 | 2 | 1 | 0 | P | P | P | - | Q | - | Q | Q |
| 15 | 1 | 1 | 1 | 1 | 1 | 2 | 3 | 3 | 3 | 2 | 1 | 0 | P | P | P | - | - | Q | Q | Q |

| INTERVAL | COUNTER COUNT | | | |
|---|---|---|---|---|
| | A | B | C | D |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8-15 | DISABLE | 1 | | |

MOTION CONTROL SYSTEM WITH INCREMENTAL DATA COMMANDS

In my copending application Ser. No. 524,965 now U.S. Pat. No. 4,000,451 granted Dec. 28, 1976, filed Nov. 18, 1974, now U.S. Pat. No. 4,000,451 there is disclosed a motion control system which produces a movement by dividing the movement up into the number of steps that should be taken for successive time intervals of equal duration. The commands therefor consist of altering the number of steps between adjacent time intervals by no more than ±1 with the duration of the time interval being set to be within the system's ability to alter its velocity to accommodate the one step change in a time interval. Thus, each time interval required a command.

While such a system has been found satisfactory, it has been found desirable to supply input commands to such a system in which the input commands consist of the number of steps that the system is to produce between its starting position and its terminating position, with such input commands being sometimes referred to as incremental or point-to-point. The use of an incremental movement consisting of a number and duration rather than a command for each time interval normally tends to decrease the quantity of commands required for a movement. One manner of translating input incremental commands into motion commands is disclosed in my copending application Ser. No. 474,672, filed May 30, 1974. However, such a system has been found to be somewhat complex and expensive when the incremental movements are limited to relatively small movements.

It is according an object of the present invention to provide a motion control system which is capable of accepting incremental input commands and which divides the input commands into motion commands to control the number of steps in successive equal time increments.

Another object of the present invention is to provide a motion control system that though limited to relatively short incremental movements is quite economical to manufacture and is easily correlated with a heretofore known motion system.

A further object of the present invention is to achieve the above objects with a motion control system that is quite simple in construction and reliable in use.

In carrying out the present invention, there is provided a source of incremental distance commands which may consist of information punched on tape with the commands being provided individually and sequentially upon request. The motion control system disclosed in my first-mentioned copending application is also provided but is limited to having two inputs with a signal on one causing the number of steps in the next time interval to increment by 1 while a signal in the other input causing a one step decrease in the number of steps in the next time interval. In the absence of a command, the number of steps remains the same.

Interconnected between the source of input incremental commands and the two inputs to the motion system is a programmed memory and a counter. The memory accepts as inputs, the binary numerical representation of the incremental distance and the instantaneous binary count of an interval counter which increments its count for each time interval. Each count of the counter with the input command constitutes a different input to the memory and the memory is so programmed that it will provide, for each count, a signal to the two inputs to either have no change, increase by 1 or decrease by 1 the number of steps in the next time interval. The maximum motion producing count of the counter equals the number of time intervals in which the incremental movement may be divided which in turn, thus limits the maximum extent of the incremental movement.

Other features and advantages will hereinafter appear.

In the drawing

FIG. 2 is a chart of some incremental movements and the resulting effects thereof in the system.

FIG. 3 is a chart of the interval counter count used for motion production and the inputs to the memory.

Figure 1:
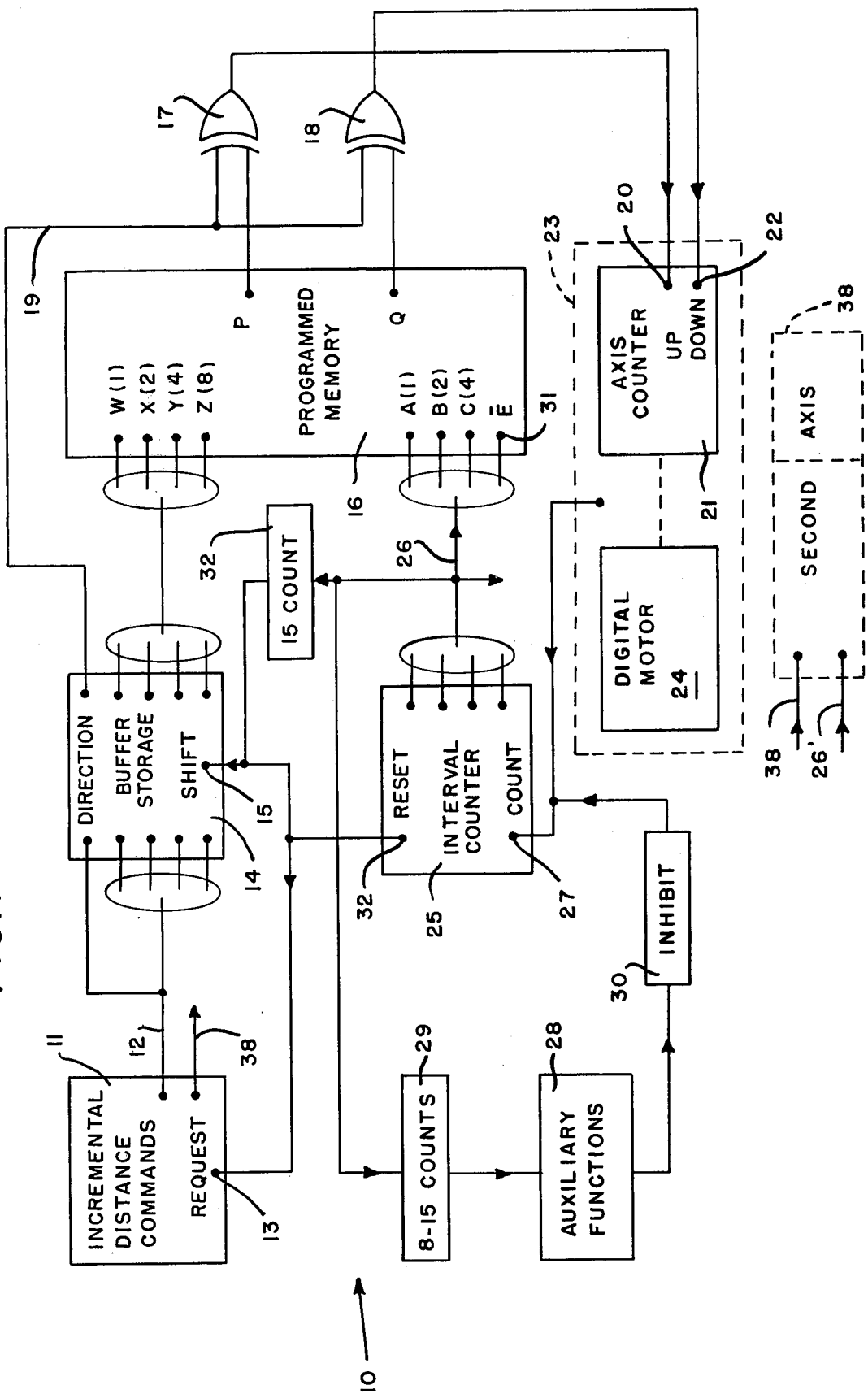
FIG. 1 is a block and schematic diagram of the system of the present invention.

Referring to the drawing, the system of the present invention for controlling one axis of movement is indicated by the reference numeral 10 and includes a source of incremental commands 11 with each command being individually and successively supplied on a lead 12 upon energization at a request terminal 13. One type of command source that may be employed is a punched tape reader with each incremental command being punched in a row on tape as a binary number and with the tape reader for each request advancing and reading the next row on the tape.

The input lead 12 is connected to a buffer storage 14 which stores in its flip-flops the incremental data of the extent of the command as a binary number and also the direction of the move on the axis either + (1) or − (0) from the lead 12. The storage 14 has a shift terminal 15, which when actuated causes the information that is received from the lead 12 to appear at the output of the storage. The numerical output information of the storage is directly connected to four inputs (W, X, Y and Z) of a 128 × 2 programmed memory 16. The two output terminals of the memory, namely P and Q, are each connected as an input to one of two exclusive OR gates 17 and 18, respectively. Another input to the two gates 17 and 18 is on a direction lead 19 from the output of the buffer storage 14.

The output from the gate 17 is connected to the up terminal 20 of an axis counter 21 while the output from the gate 18 is connected to the down terminal 22 of the counter 21. The counter 21 constitutes part of a motion control system 23 that is specially disclosed in my first-mentioned application and which sets the steps in an interval that are to be taken by a digital motor 24 in accordance with its count.

Whenever the P terminal has a high or 1 voltage and the Q terminal a low or 0 voltage, the up terminal 20 of the axis counter 21 is activated increasing the count of this counter and increasing the number of steps in an interval by one. When P is 0 and Q is 1, then the down terminal 22 is activated, the counter 21 count is decreased by 1 and the number of steps in the next interval is decreased by one. This applies to movement in the direction when the direction lead 19 has a 0 voltage and hence would use counts 8–15 of the counter 21, the latter being disclosed as a four bit counter.

For motor movement in the opposite direction, when the direction lead 19 is a 1, and counts 0–6 of the counter 21 are used, with a 0 count having the most steps in an interval, then the above is reversed. Thus a P of 1 and a Q of 0 will cause the down terminal to be activated, decreasing the counter count but increasing the number of steps in the reverse direction in the next interval while the opposite, a P of 0 and a Q of 1, decreases the number of steps in the next interval by increasing the counter count.

When both P and Q are the same, 1 and 1 or 0 and 0, no change results in the number of steps in the next interval irrespective of its direction. Moreover, a counter 21 count of 7 produces no motion as it commands zero steps in a time interval.

The programmed memory 16 has three additional inputs A, B, C which are connected to the count terminals of a four bit binary interval counter 25 by a lead 26. A count terminal 27 in the interval counter 25 is connected to the clock terminal (clk) of the motion control system (identified in my above-noted application by the reference numeral 46) and receives a pulse at the beginning of each time interval with the intervals being caused to have a constant selected duration.

The incrementing of the counter 25 by each clock pulse, changes its count which, as a binary member, is impressed on the input terminals A, B and C over the lead 26. In the specific embodiment shown only counts of 0-7 are used which limits the maximum number of intervals that can be commanded by one input command to eight which in turn may produce 15 steps. It should be noted, however, that even with this maximum relatively small movement, that the necessary command is only one command instead of the eight commands that my heretofore system required.

Preferably, the interval counter 25 has additional counts, herein shown to be 8-15 and these additional counts may be employed to actuate auxiliary functions or devices, as represented by a block 28 in FIG. 1, when an incremental movement caused by counts 0-7 has been completed. A block 29 may pass counts 8-15 to the auxiliary devices in block 28 at the end of each commanded movement. Additionally, the auxiliary function block 28 may include an inhibit block 30 which inhibits the acceptance of the clock pulses by the counter and will thus postpone until its removal, the changing of the interval counter 25 count.

During the counts of 8-15, the memory is disabled by a connection to its E terminal 31 from the binary 8 terminal of the counter 25. This prevents the memory from having an output, which could alter the count of the motion system counter 21. As will be hereinafter understood, the system ends every commanded movement with no or zero steps per interval which enables the clock pulses to continue to index the counter 25 for the 8-15 counts but yet have no movement produced.

With the occurrence of a count 15, a block 32 provides a signal to the request terminal 13 of the incremental commands and to the shift terminal 15 of the buffer storage so that the next command stored in buffer storage is applied to the W, X, Y and Z inputs and to the direction lead 19 while the subsequent command is read and transferred from the incremental commands 11 to be stored in the buffer storage 14. It will be understood that the buffer storage output maintains the commands of the current movement at the memory input terminals for the duration of the counting of the counter 25 when it then receives a command to change to the next movement binary representation.

The block 32 may also supply a reset pulse to a reset terminal 33 of the counter 25 if desired though such would not be necessary if the counter is of the repeating type.

Referring to the chart shown in FIG. 2, a vertical column indicated by the reference numeral 34 represents the extents, in steps of all the commanded movements to which the present system may respond. The next four vertical columns 35 represent the binary states that are impressed on the memory input terminals W, X, Y and Z so that W has the first digit, X the second, Y the third and Z the fourth of a binary representation the number of steps in each movement. The next eight vertical columns 36 under the title "STEPS PER INTERVAL", set forth in vertical rows each of the intervals 0-7 that occur when the counter 25 has a corresponding count and in each of the intervals for each of the movements, the number of steps that will occur in the indicated interval.

The subsequent eight columns 37 under the heading "COMMAND PER INTERVAL" again has the 0-7 intervals forming eight vertical columns and for each of the movements there appears in the columns a P, Q or —. A P represents that a binary 1 appears at this output terminal of the memory while a binary 0 appears at the Q output terminal. A Q represents that a binary 1 appears at the Q terminal while a binary 0 appears at the P terminal. A — indicates both P and Q hve the same binary state and hence cause no change in the counter 21a of the motion system. Thus, P represents an increase in the count of counter 25 while Q represents a decrease in the count.

The inputs to the terminals A, B, C from the counter 25 for each interval or counter count is shown in FIG. 3.

The memory 16, as is known in the art, may be programmed to produce either a P, a Q or a — output for each possible input. The number of possible inputs consists of the number of intervals per command times the maximum number of movements so that in the specific embodiment herein disclosed there are 8 × 16 or 128 possible inputs. There is thus a different binary input to the memory for each interval in each movement and each input is unique and different from any other input.

As an example, in the 2 interval of a 9 step movement, the memory input is 1001 010 for the Z, Y, X, W, A, B and C terminals respectively and with such an input the memory is programmed to produce a P output. For the fourth interval (1001001) of the same movement, the memory is programmed for a Q output as indicated in the 4th column and 9th row in the FIG. 2 chart under the title "COMMAND PER INTERVAL".

As the system alters the number of steps per interval by one, the number of intervals and the maximum number of steps are interrelated with it being required that there be sufficient intervals to provide the necessary changes in steps per interval to achieve the complete movement. Thus, if it is desired to increase the maximum number of steps to 31 in a movement, the system may be easily altered by selecting a memory that can accept five binary digits for the number of steps and four binary digits for the interval count so that steps per interval of 1,2,3,4,5, 5,4,3,2,1,1,0 may be obtained in twelve intervals.

While the above-described structure is employed to control movement on only one axis, it is contemplated that a second axis, or a third may be also controlled so that movement may be directed to occur simultaneously on plural axes. As indicated in FIG. 1 a block 38 represents a second axis which is identical to the first described axis and thus contains major components identical to components 14, 16, 17, 18 and 23. The counter 25 and the incremental commands 11 are shared by the two axes. Inputs to the second axis 38 are a lead 39 over which the second axis numerical movement is transferred from the incremental commands 11 and a lead 26' by which the count of the counter 25 is communicated. While the incremental data to both axes may be transferred simultaneously, it is also contemplated that the commands would be alternatingly sequential. With such a manner of storage, the second axis incremental movement could be transferred on the interval counter count of 14 and the first axis as shown on the counter count of 15 through any desired manner of directing each axis' commands to the axis' respective buffer storage may be employed if desired.

It will accordingly be understood that there has been disclosed a motion control system which accepts input commands in the form of a number of steps that an incremental move is commanded to have. The system subdivides the movement into steps to be taken during successive time intervals by controlling the altering of the number of steps in the next time interval as compared to the number in the present time interval. The system preferably includes a memory programmed to provide for each possible movement commanded and for each possible extent, the motion command for altering the steps in the next time interval.

Variations and modifications may be made within the scope of the claims and portions of the improvements may be used without others.

I claim:

1. A motion control system for accepting an input command of the number of steps in an incremental movement and producing said movement comprising means for providing a representation of the number of steps in the movement with each representation being unique for each number of steps, means for providing a plurality of successive time intervals for the movement, means for representing each time interval with a representation unique to it, motion means for providing one number of steps for each time interval from a plurality of different numbers and for accepting a signal to increase, decrease or not change the number of steps in the next time interval from the previous time interval, and means for simultaneously sensing both representations and supplying the signal for each time interval.

2. The invention as defined in claim 1 in which the means for providing the representation of the number of steps in the movement maintains the representation during the said movement.

3. The invention as defined in claim 1 in which both representations are binary and in which the means for simultaneously sensing includes a programmed memory.

4. The invention as defined in claim 3 in which the memory has a pair of outputs and in which the outputs are different to produce a signal to alter the number of steps in the next time interval.

5. The invention as defined in claim 4 in which the signal produced by both memory outputs being the same produces no change in the number of steps.

6. The invention as defined in claim 1 in which there are means for having the same number of time intervals for each movement.

7. The invention as defined in claim 6 in which the motion means only alters the number of steps between adjacent time intervals by one step, in which there is a maximum number of steps in an incremental movement and in which the same number of time intervals is sufficient to provide for the maximum movement.

8. The invention as defined in claim 1 in which there are a plurality of time intervals during which the simultaneous means provides a no change signal.

9. The invention as defined in claim 8 in which the plurality of time intervals occurs after the commanded movement has been completed and in which during one of said time intervals there are means for causing the input command for the next movement to be received.

10. The invention as defined in claim 1 in which the input command includes a command for a movement in the reverse direction, and in which there are means in the simultaneous means for reversing the signal with a reverse command.

11. The invention as defined in claim 1 in which there is an input command for producing a second movement having a second number of steps simultaneously with the first movement, in which there are second means for providing a second representation of the number of steps in the second movement, second motion means for providing one number of steps for each time interval from a plurality of different numbers and for accepting a second signal to increase, decrease or not change the number of steps in the next time interval from the previous time interval and second means for simultaneously sensing both the second representation and the time interval representation and supplying the second signal for each time interval.

* * * * *